United States Patent
Blants et al.

(10) Patent No.: US 6,529,717 B1
(45) Date of Patent: Mar. 4, 2003

(54) MENU-DRIVEN INPUT OF SMS-MESSAGES

(75) Inventors: Lioudmila Blants, Espoo (FI); Petteri Saarinen, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 887 days.

(21) Appl. No.: 08/826,922

(22) Filed: Apr. 8, 1997

(30) Foreign Application Priority Data

Apr. 9, 1996 (FI) .................................................. 961551

(51) Int. Cl.[7] .......................... H04B 1/06; H04M 11/00; H04M 1/66; H04Q 7/20
(52) U.S. Cl. ..................... 455/186.1; 455/403; 455/411; 455/550; 370/347; 704/466
(58) Field of Search .................. 379/201; 370/95.1, 370/347; 455/186.1, 403, 411; 704/466

(56) References Cited

U.S. PATENT DOCUMENTS

| | | | |
|---|---|---|---|
| 4,670,747 A | 6/1987 | Borras et al. .......... 340/825.56 |
| 5,153,582 A | 10/1992 | Davis .................... 340/825.44 |
| 5,404,580 A | 4/1995 | Simpson et al. .............. 455/89 |
| 5,603,081 A | * 2/1997 | Raith et al. ................. 370/95.1 |
| 5,603,084 A | * 2/1997 | Henry, Jr. et al. ....... 455/186.1 |
| 5,604,744 A | * 2/1997 | Andersson et al. ......... 370/347 |
| 5,689,547 A | * 11/1997 | Molne ........................ 379/201 |
| 5,848,356 A | * 12/1998 | Jambhekar et al. ......... 455/403 |
| 5,878,397 A | * 3/1999 | Stille et al. ................. 704/466 |
| 5,887,249 A | * 3/1999 | Schmid ...................... 455/411 |

FOREIGN PATENT DOCUMENTS

| | | |
|---|---|---|
| EP | 0659004 A1 | 6/1995 |
| EP | 0 693 860 A2 | 1/1996 |
| EP | 0698845 A1 | 2/1996 |

OTHER PUBLICATIONS

Dettmer, "Short Message gets Longer (GSM)", IEE Review, 5/97.*

Jiang, "Reliability, Cost and Delay Performance of Sending Short Message Service in Wireless Systems", Universal Personal Communications, 1998.*

* cited by examiner

Primary Examiner—William Cumming
(74) Attorney, Agent, or Firm—Perman & Green, LLP

(57) ABSTRACT

A mobile communication device utilizes the short message service of its communication network to generate messages. The messages are constructed from a series of fields. From stored data a series of questions and optional answers are pressented. The user can select the appropriate answer from the memory. Each of the answers is correlated to a message component which are compiled by the microprocessor to form a complete message.

12 Claims, 2 Drawing Sheets

MENU-DRIVEN INPUT OF SMS-MESSAGES

BACKGROUND OF THE INVENTION

The invention relates in general to the drawing-up of messages in character string format in electronic apparatus, and in particular to the creation and sending of short messages by means of an electrical communication device.

The short message service (SMS) is a method of comunication known from digital mobile phones, two-way paging devices and other corresponding communication devices, wherein a sender creates and sends by means of his apparatus a character string which is signalled through the communication system without the establishment of an actual telephone connection. Transmission of short message requires only a little capacity of a transmission system, as compared to a circuit-switched or facsimile connection, so it is advantageous to use the SMS to convey short notices.

In the prior art, when a user creates a short message, he forms the character string one character at a time. A digital mobile phone usually has a has a keypad containing number buttons and special character buttons as well as function keys. Because of the small size of mobile communication devices and the relatively large number of letters, the devices usually do not contain letter keys, but the user enters the letters using a special letter selection function, pressing number, special character and function keys in a certain order. Characters thus entered are shown on the device's display.

The formation of a textual message by means of the method according to the pripr art is relatively slow since the selection of one letter may require several keystrokes.

An object of this invention is to provide a method whereby a short message can be quickly and easily formed so as to be sent.

This and other objects of the invention are achieved by a menu-controlled formation of a short message, wherein the user selects parts of the short message on the basis of questions and/or options presented by the communication device.

SUMMARY OF THE INVENTION

According to a first aspect of the present invention there is provided a method of creating a short message having a number of data fields on a mobile communications device or subsequent transmission via a short message serive (SMS), the method comprising presenting a separate data input request to a user for each field, receiving a user response to each request, and compiling the received responses into a short message for said subsequent transmission.

Preferably, at least one of said fields consists of a plurality of alphanumeric characters.

Preferably, the step of compiling the received responses comprises inserting field separators between the said fields. Alternatively, or in addition, said fields may have a predetermined length.

Preferably, said step of presenting separate input requests comprises presenting for each field at least one possible response, said possible response being retrieved from a memory of the device, wherein said user response may comprise accepting said presented response.

Preferably, the number of fields making up said short message is predetermined and is stored in a memory of the device.

According to a second aspect of the present invention there is provided a method fr creating a short message on an electrical communication device, which short message is a string of charactes complying with a predetermined structure, characterised in that the communication device presents to the user data input options according to said struture and, in response to data entered by the user, said communication device compiles said short message in accordance with said structure.

In an embodiment of the invention, the syntax of short messages needed often or regulary is stored in the memory of the mobile phone or other communication device in the form of questions and/or options. The storage may be permanent in nature or it can be realized dynamically by loading the user interface part for a certain short message application in the communication device when needed. The loading according to need may be realized by delivering to the user a smart card or other memory medium which, when connected to the communication device, places the data in it at the disposal of the communication device. The device shows to the user on its display questions and/or menu options and the user responds to them either by entering characters by means of the device's keypad in a known manner, or by choosing one of the options given on the display. An option can be chosen in such a manner that the user e number button representing the option in question or moves the cu the desired option and presses a certain Enter key. When the mes user presses a certain send or end key or responds confirmatively and end questions so that the device saves the message in memo immediately via the communication network to the recipient in a kn Embodiments of the invention not only bring improvements on the characteristics according to the prior art, but provide a totally new and unforseen function which until now has not even been required of short messages. Since the messages formed by means of the method comply strictly, if required, with a certain constant syntax, they are easily understood by a human recipient and are also suitable for futher automatic processing by a receiving machine. This means the receiving apparatus can for example perform certain commercial actions (cf. telebank) or collect standard-form short messages from several senders and draw up statistics and reports based on them. Short messages according to the prior art have been free-form combinations of words and sentences and their recipients need to posses human intelligence to understand them.

In a preferred embodiment of the method according to the invention, typing errors can be avoided if the sender creates the short message by successively choosing the desired multi-choice options, thereby avoiding the need to form words one characterat a time.

Standard short messages have many possible applications, e.g. in the internal communications of a company, in trade between companies or private persons, and in communication between a consumer and a service provider.

DESCRIPTION OF THE DRAWING

The invention is described in more detail with reference to the preferred embodiments presented by way of example, and to the accompanying drawings in which.

DETAILED DESCRIPTION OF THE INVENTION

Figure 1:
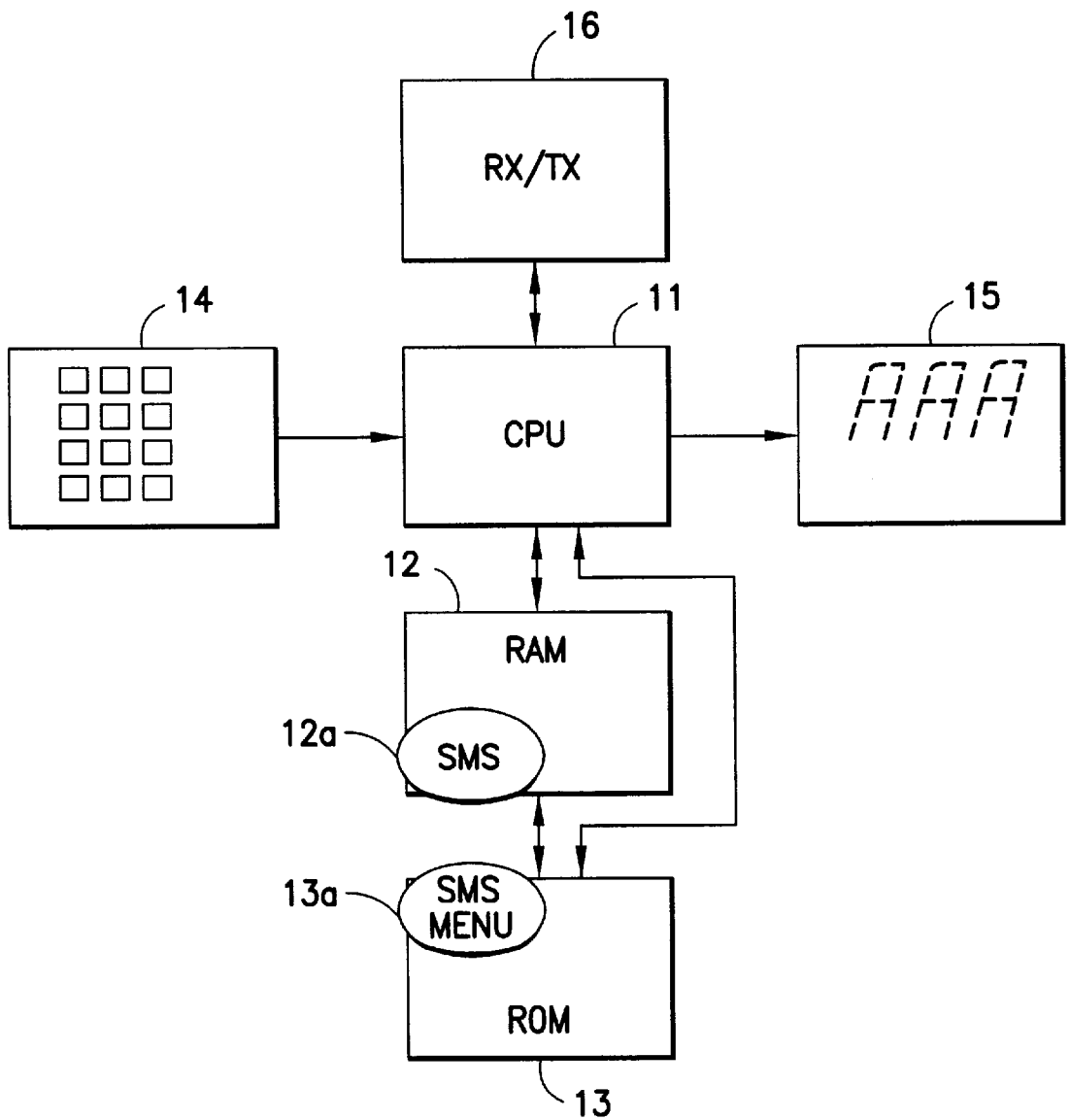
FIG. 1 shows diagrammatically parts of a digital mobile phone.

FIG. 1 shows a block diagram depicting part of a digital mobile phone. Operation of the phone is controlled by a central processing unit 11 (CPU), which advantageously is a microprocessor. It has at its disposal a random access memory (RAM) unit 12 in which all the run-time data is stored. The mobile phone also has a non-volatile read-only memory (ROM) block 13, which advantageously is an electrically erasable programmable read-only memory (EEPROM), which contains all the data that needs to be retained when power is switched off on the mobile phone. Part of the ROM block 13 may be located in a known manner in a smart card, such as a subscriber identity module or SIM card (not shown) connected to the mobile phone. In addition, the mobile phone has a keypad 14 and a display 15. Some mobile phones use touch-sensitive displays, in which case a separate keypad is not needed as the functions which are usually associated with the keypad are realized through the display. The mobile phone further comprises a communication part 16 which contains the electronic transmission and reception parts as well as radio-frequency parts in a known manner.

In this block diagram shown in FIG. 1 a certain part of the RAM 12 is designated as message, or SMS, memory 12a. The mobile phone users this part of the memory for te temporary storage of short messages to be transmitted and it can be a permanently reserved or dynamically allocated memory area. In addition, part of the ROM 13 is reserved for the storage 13a of short message menus. It contains the standard question and possible optional answers that are needed for the creation and processing of standard short messages.

Figure 2:
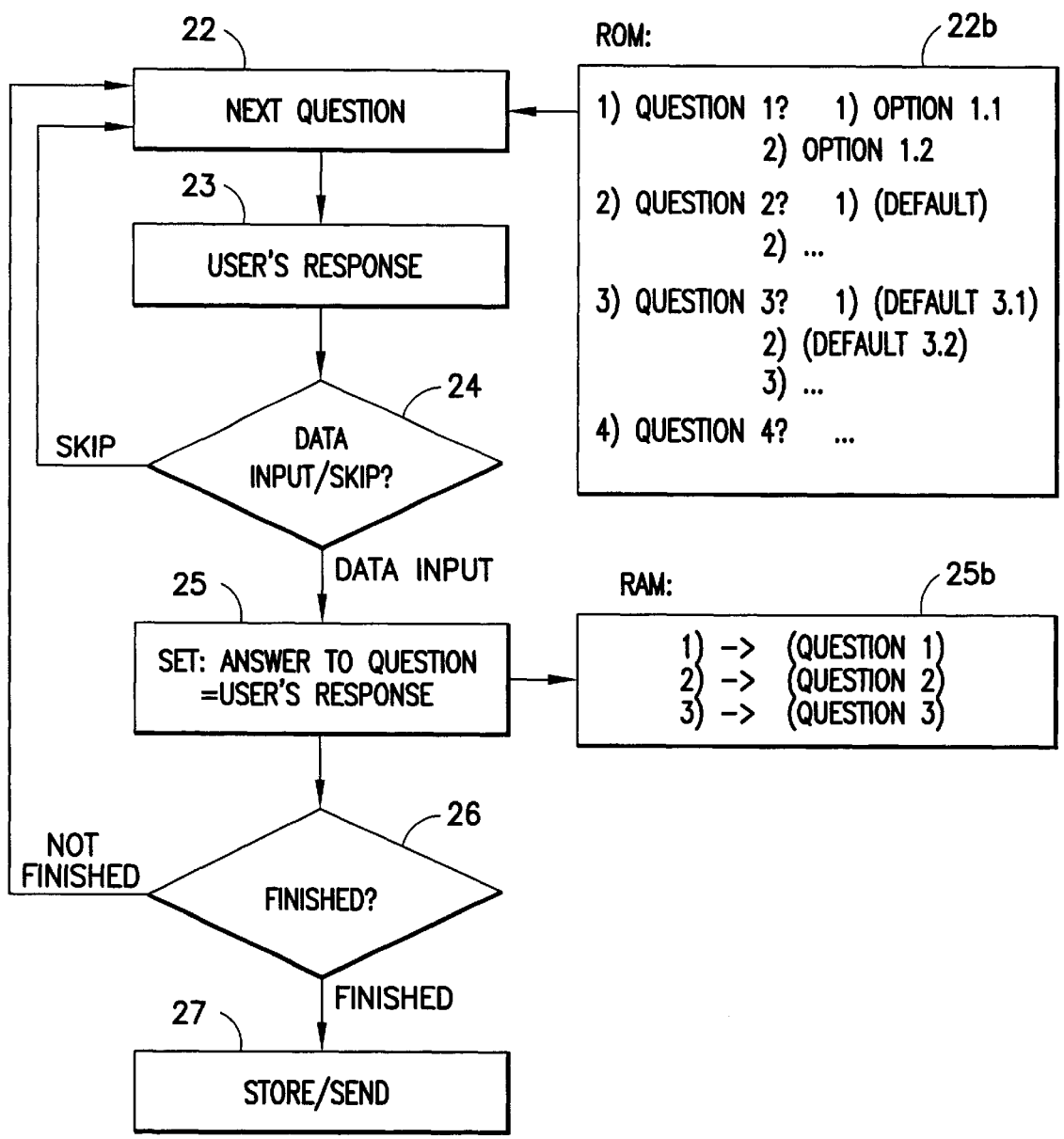
FIG. 2 shows a flow chart of a method of operating the phone of FIG. 1.

FIG. 2 shows a flow chart describing the method according to a preferred embodiment of the invention. There are several known methods to start the short message service on a mobile phone; selection of the appropriate option from the phone's function menu is one. The invention may also be appllied in such a manner that the user does not separately start the short message service but instead starts a certain service application (e.g. "bank service", "health services", etc.) that uses short messages for communication. For example, if the user selects a telebank service, he need not even be aware of the fact that the service is based on the use of short messages.

In step 22 the mobile phone reads from the ROM the questions associated with the application selected by the user as well as the answer structures associated with said questions. The list of questions and answer structures constitutes a menu for the creation of a short message according to block 22b. In this example it is assumed that the user pressed key 1, so that the short message creation menu includes questions about the desired function type, about the personal data of the owner of the account, and about the details of the function. The function type may be a balance enquiry or payment, so there are two options available for the first question.

In this context the word "question" must be understood very broadly, so that it covers all indications by means of which the mobile phone tells the user that it is waiting for a certain input and/or user action.

The display of a mobile phone is usually rather small, so it is advantageous to present the questions one at a time. The mobile phone displays the first question to the user, in this case "Balance or payment?". In block 23 the user presses a certain key corresponding to the option chosen by him. Let us assume that he chooses payment. In block 24 the mobile phone checks whether the user issued a skip command or entered data. A skip command means that the user will not answer this particular question. IF the user entered data, the data is stored in the RAM according to blocks 25 and 25b. Next, the procedure returns via block 26 to block 22 and displays the next question, viz, "Player's name?". At the same time, the following options are displayed:

1) John Smith

2) . . .

wherein John Smith refers to the user's name, which the phone has read from the personal data stored in the SIM card. The user's name is the default because it is probable that the owner of a SIM card uses the mobile phone, to which the SIM card is connected, mainly to pay his own bills. The three dots in the second option mean that the user can enter any name by means of the mobile phone's keypad in a known manner. Again, the answer is stored in the RAM according to block 25 and 25b. The procedure once again returns to block 22 wherein the phone displays the third question "Account number?" and provides the following options:

1) 110101–123456

2) 110134–1234567

3) . . .

wherein the two default values are the user's most commonly used accound numbers and the third option means any account number entered on the keypad. The answer is stored in the RAM according to blocks 25 and 25b. Other questions may be e.g. the amount paid, for which there is no default, and the data of payment. When the user has answered all the questions the procedure regards the message as completed in block 26 According to a preferred embodiment, the mobile phone may display the completed message for verification by the user before sending, or it may prompt the user to press a certain OK key to send the message.

Thereafter, from the user's point of view the sending of the short message goes on as in the prior art, depicted by blick 27. The transmitting device may send either a complete character string, comprehensible to a human, or only a code sequence which contains the user-entered data coded into a machine-readable form. Since the receiving device advantageously contains the same short message menus as the sensor's device, it can reconstruct the message and carry the operations required by it on the basis of the coded data, in which case the amount of data transitted can be smaller.

As a second example, we can take a standard notice of meeting used inside a company. The sender of the notice selects the notice of meeting menu in the "Intracompany communications" function and enters the necessary data concerning the time and place and other particulars of the meeting in response to the questions displayed by the communication device. The resulting short message to be transmitted could be in plain language, e.g. as follows:

Meeting 12.30. In small cnference room. Signed Anne.

The transmitting device may send either the whole character string shown above or jsut a code sequence containing the following information:

q1: 12*30 q1: 2 s: Anne wherein the user, using the number keys, ahs entered "12*30" in response to the first question and answered the second question by choosing option 2. The signature "Anne" may be entered by the user letter by letter, or the transmitting device may read it automatically from the SIM card or other memory medium. The foundation shown above, reconstructed by the receiving device, is intended to enhance the readability of the message for a human recipient. As the formulation is always the same, the receiver may also be a computer or a multi-purpose communication device containing the user's electronic calender. Thanks to the standard formulation the receiving device can decode the message automatically and make an entry in the electronic calender so that the user of the receiving device sees that he has a meeting at 12.30 in the small conference room and the convener of the meeting is Anne.

It will be apparent to one skilled in the art that the embodiments described above are presented by way of example only and do not limit the invention. Different menus, options, and push-button or key commands are variations of the present invention. Also, the receiver can easily realize different variations of the formulation and processing of the standard messages, which variations are included in the scop of the invention defined by the claims set forth below. All functions required by the invention are advantageously realized as software processes, adding the required computer programs to the application software representing the mobile phone's user interface. Short message menus and other software related to the use of the method according to the inventoin can be loaded into the phone's memory in connection with software updates in accordance with the prior art.

What is claimed is:

1. A method of creating a short message within a mobile communication device for subsequent transmission via a short message service (SMS), said message having a number of data fields, said method comprising the steps of: storing, within the communication device, a separate data input request for each field, storing, within the communication device, at least one possible user response for each input request, selecting a user response to each request, and compiling the received responses into the short message for subsequent transmission via said short message service (SMS).

2. A method according to claim 1, wherein at least one of said fields consists of a plurality of alphanumeric characters.

3. A method according to claim 1, wherein the step of compiling the received responses comprises inserting field separators between said fields.

4. A method according to claim 1, wherein said fields have a predetermined length.

5. A method according to claim 1, wherein the number of fields making up said short message is predetermined and is stored in a memory of the device.

6. A method for creating a short message on an electrical communication device, which short message is a string of characters complying with a predetermined structure, characterized in that the communication device presents to the user data input options according to said structure and, in response to data entered by the user, said communication device compiles said short message in accordance with said structure, wherein the message is in human readable form.

7. A method according to claim 6, wherein said structure is a sequence of successive answers comprising at least a first answer and a second answer the mutual order of which is predetermined, so that said communication device presents to the user a first question, in response to a first answer by the user the communication device presents to the user a second question, and in response to a second answer by the user said communication device creates a short message from the first answer and the second answer.

8. A method according to claim 6, wherein instructions for forming said structure are loaded into said communication device by storing them on a separate memory medium which can be connected to said communication device.

9. A method according to claim 7, wherein in order to create said short message said communication device describes the elements of said short message with predetermined abbreviations the order of which complies with said structure.

10. A method of creating a short message within a mobile communications device for subsequent transmission via a short message service (SMS), said message having a number of data fields, said method, as described in claim 1, wherein said selection comprises accepting by the user of the stored input response.

11. A method of generating a message for transmission by a cellular phone, utilizing the short message service of a cellular communication system, wherein said cellular phone includes a microprocessor control, a storage medium, and an input device, said method comprising the steps of:

storing at least one application in said storage meduim, wherein said application includes, a series of questions relating to said application, a series of answers to said questions, and a series of message components, suitable for transmission in the short message service, correlated to said answers;

selecting said application by using the input device;

presenting said series of questions related to said selected application to the user;

answering said series of presented questions by selecting from the stored series of answers through the use of the input device;

processing said answers in the microprocessor and compiling said message components in response to said answers;

forming a message suitable for transmission utilizing said short message service from said compiled message components; and transmitting said message over said cellular communications system.

12. A mobile communication device for creating a short message for subsequent transmission via a short message service (SMS), the short message having a number of data fields, said device comprising: a memory for storing a separate data input request for each field and at least one input response for each request; a display for presenting the stored input response to the user; a data input device for allowing the user to select a stored input response; and a microprocessor fr compiling the received responses into a short message for subsequent transmission via said short message service.

* * * * *